United States Patent [19]
Haseley et al.

[11] Patent Number: 5,730,567
[45] Date of Patent: Mar. 24, 1998

[54] ANTI-TAMPER FASTENER

[75] Inventors: Daryl R. Haseley, Orchard Park; Brent A. James, Williamsville, both of N.Y.

[73] Assignees: McGard, Inc.; Diversified Control, Inc., Orchard Park, N.Y.

[21] Appl. No.: 738,849

[22] Filed: Oct. 28, 1996

[51] Int. Cl.$^6$ .................. F16B 23/00; F16B 35/06; F16B 37/08
[52] U.S. Cl. .................. 411/403; 411/396; 411/432; 411/910
[58] Field of Search .................. 411/6, 372, 373, 411/402–405, 431, 432, 396, 910

[56] References Cited

U.S. PATENT DOCUMENTS

| | | | |
|---|---|---|---|
| 1,899,343 | 2/1933 | Mackey et al | 411/910 X |
| 2,823,725 | 2/1958 | Trinca | 152/431 |
| 3,978,698 | 9/1976 | Ono | 70/165 |
| 4,037,515 | 7/1977 | Kesselman . | |
| 4,302,137 | 11/1981 | Hart | 411/910 X |
| 4,406,140 | 9/1983 | Wolter | 70/231 |
| 4,687,392 | 8/1987 | Bidwell | 411/6 |
| 4,690,167 | 9/1987 | Skipper | 411/910 X |
| 4,726,723 | 2/1988 | Bainbridge | 411/432 |
| 4,897,008 | 1/1990 | Parks | 411/432 |

FOREIGN PATENT DOCUMENTS 360304  11/1931  United Kingdom ........... 411/910

*Primary Examiner*—Neill R. Wilson
*Attorney, Agent, or Firm*—Joseph P. Gastel

[57] ABSTRACT

A fastener including a body, a shroud rotatably mounted on the body, and a resilient retaining ring located in opposed grooves between the shroud and the body, one end of the body extending outwardly beyond the shroud, and a frusto-conical outer surface on the shroud which has its larger side proximate the end of the body which extends beyond the shroud.

35 Claims, 5 Drawing Sheets

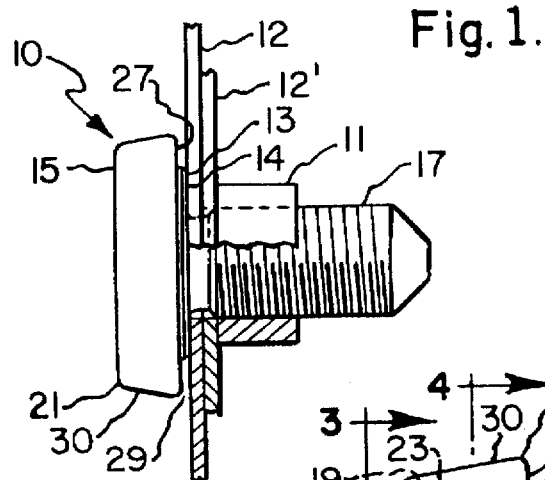
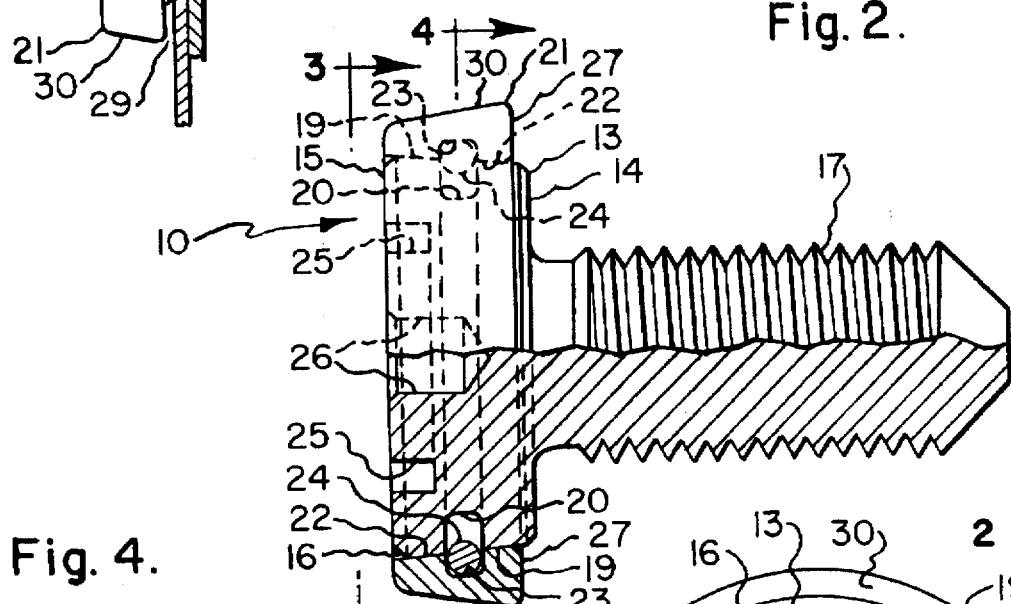
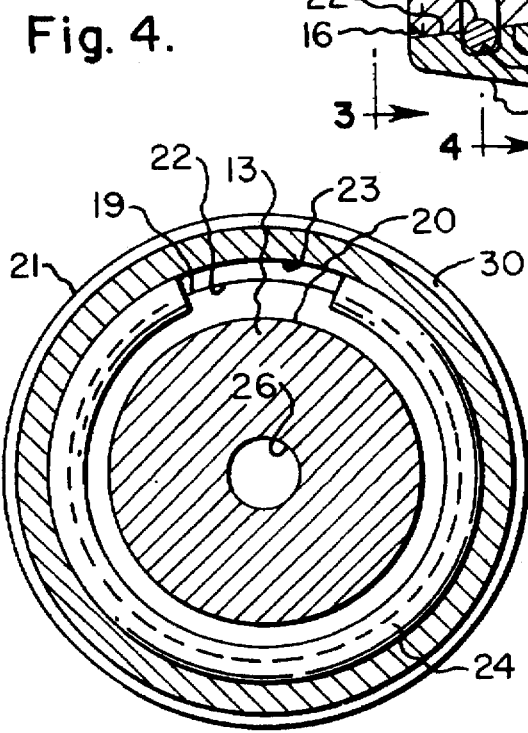
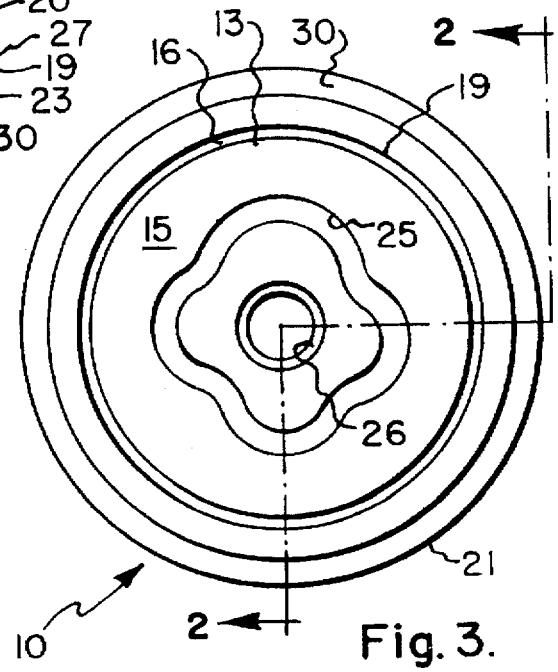

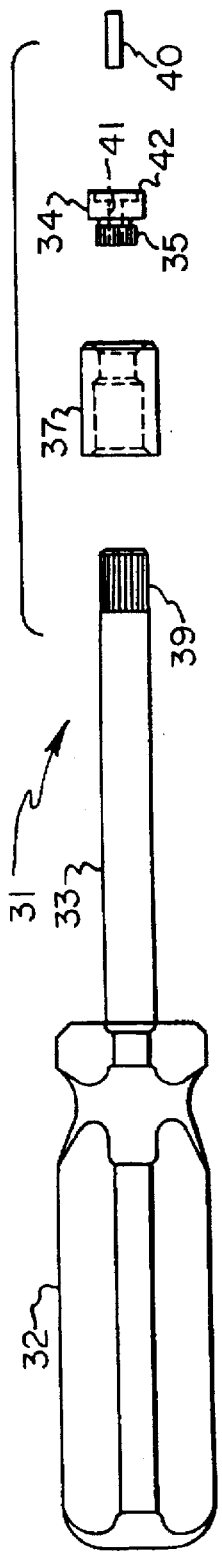
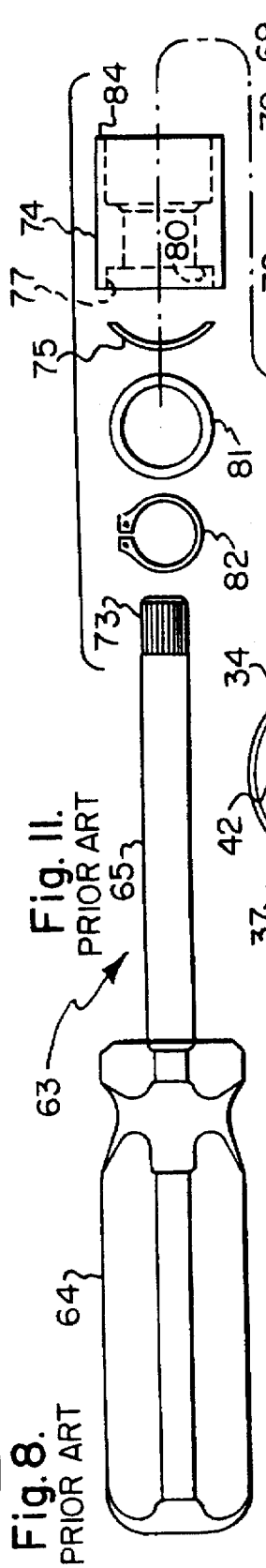
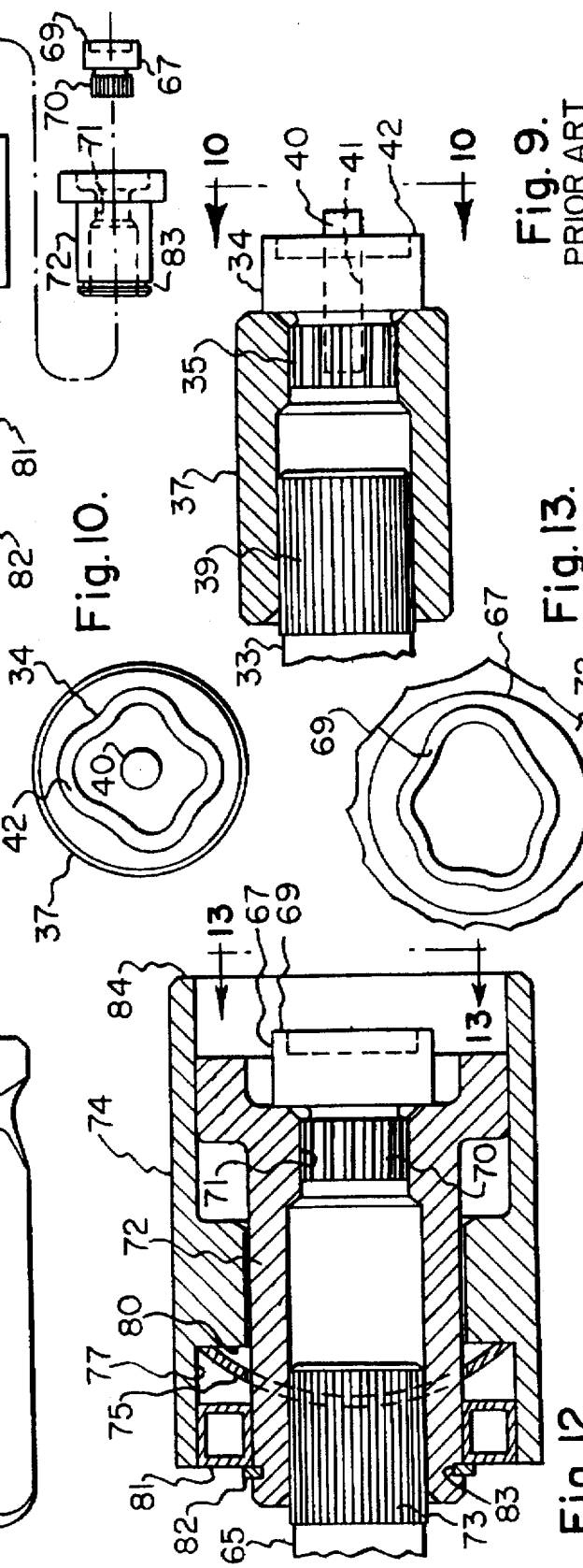
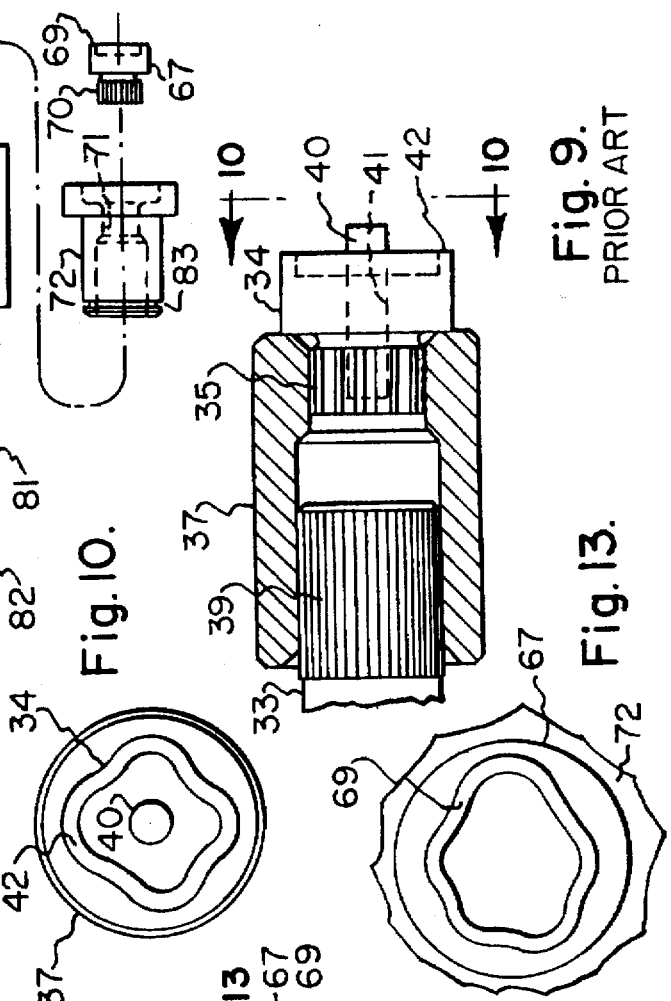

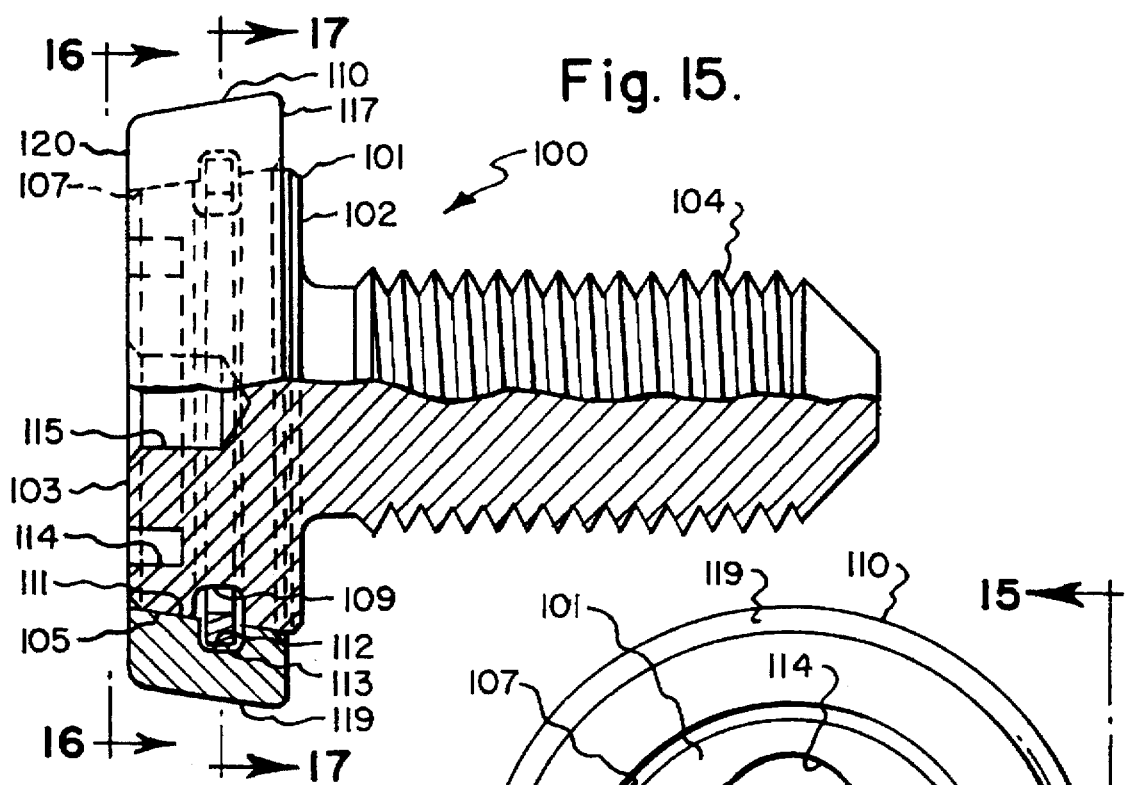
Fig. 15.
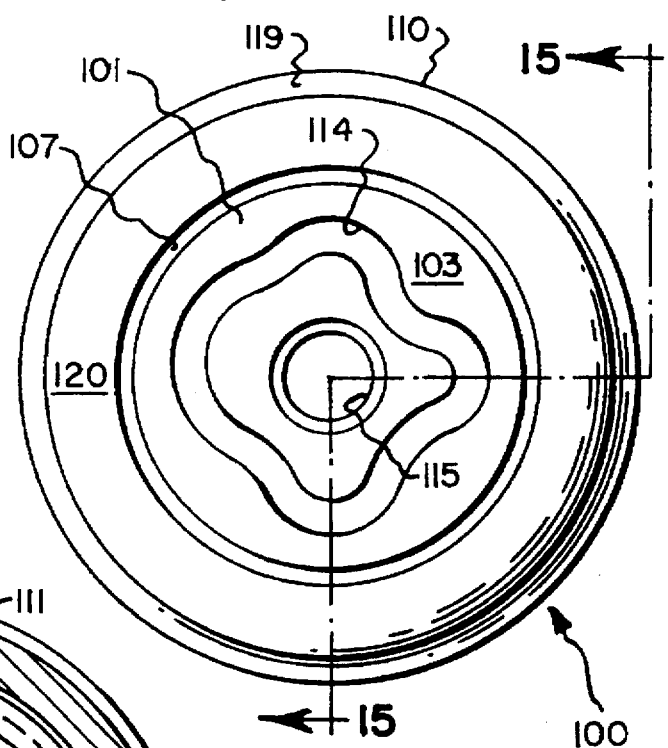
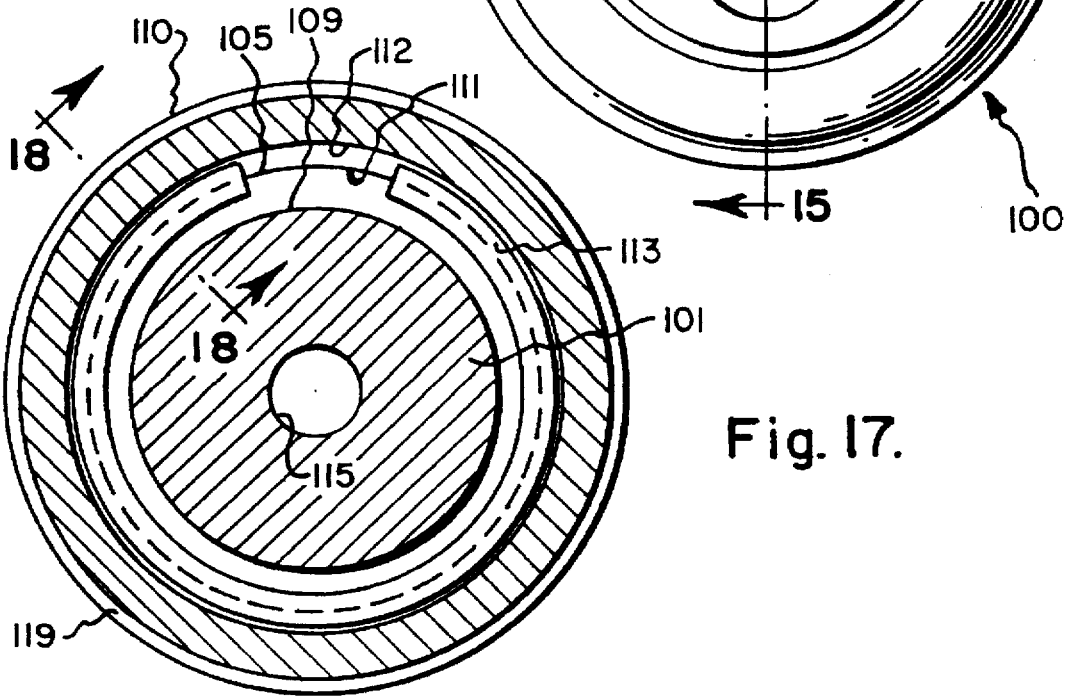
Fig. 16.
Fig. 17.

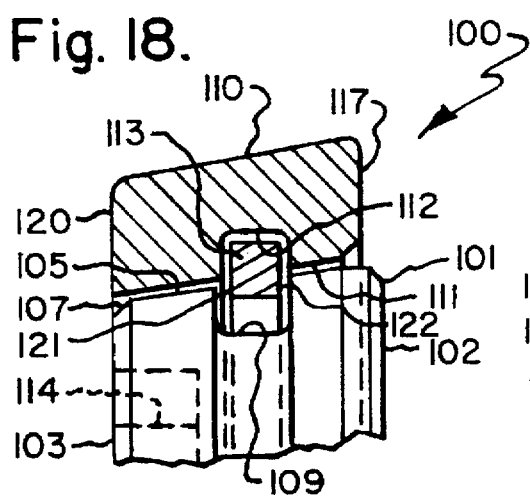
Fig. 18.
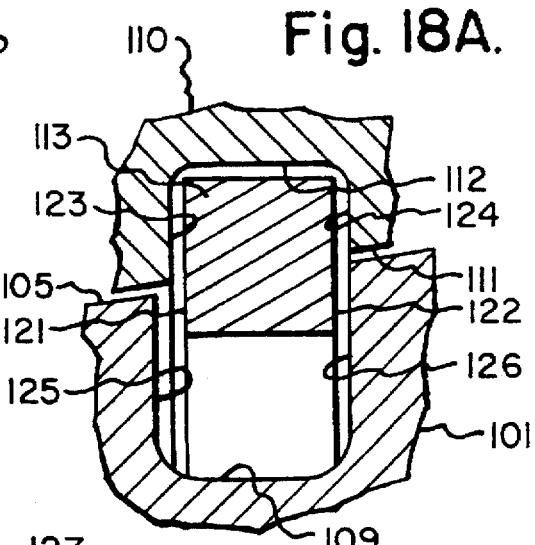
Fig. 18A.
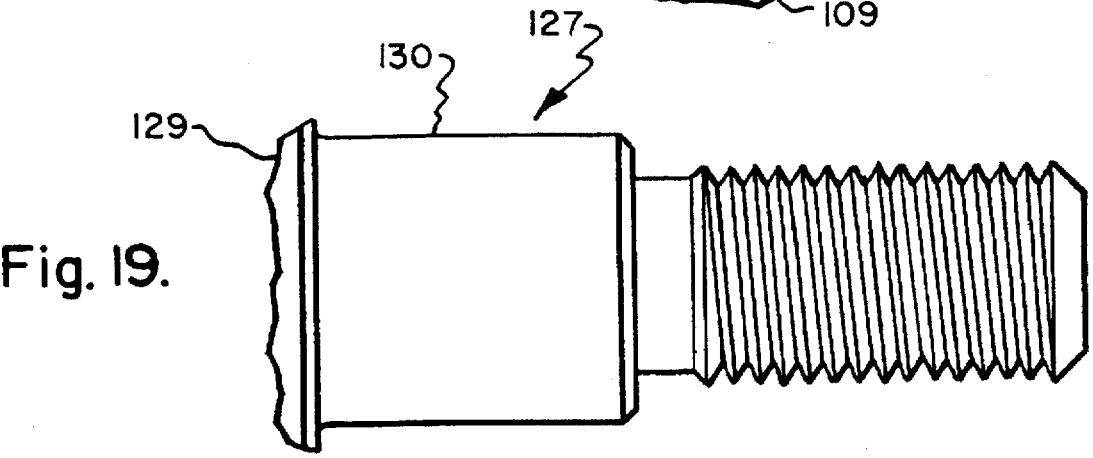
Fig. 19.
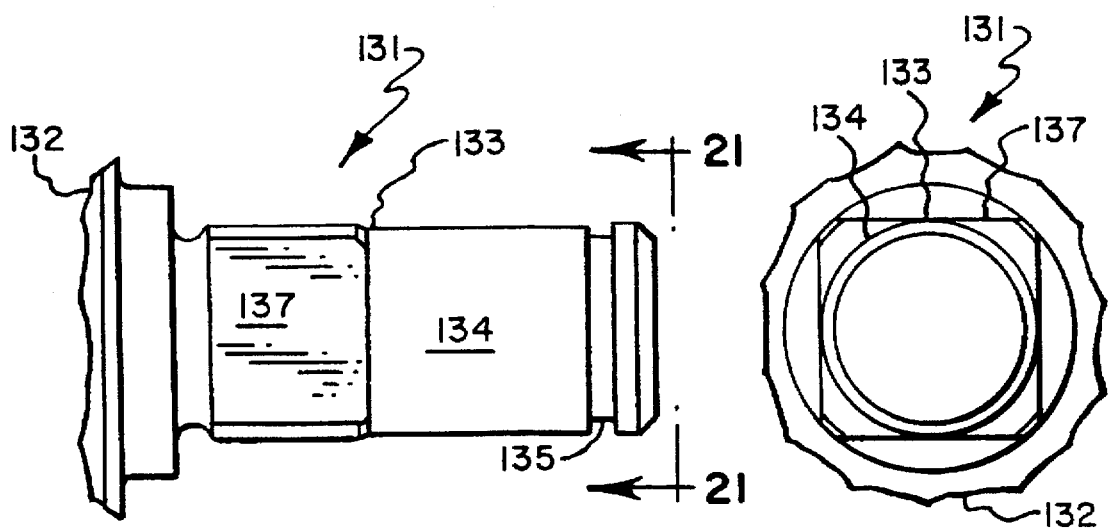
Fig. 20.
Fig. 21.

5,730,567

ANTI-TAMPER FASTENER

BACKGROUND OF THE INVENTION

The present invention relates to an improved anti-tamper fastener which requires a specialized key for turning it.

There are in existence anti-tamper nuts which require a specialized key to turn them. Nuts of this type have a rotatable shroud which cannot be gripped by a plier or wrench and are disclosed in U.S. Pat. Nos. 4,726,723 and 4,897,008. It is with an improved anti-tamper fastener of the foregoing types that the present invention is concerned.

SUMMARY OF THE INVENTION

It is accordingly one object of the present invention to provide an improved anti-tamper fastener which is of relatively simple construction in that it consists of a body which accepts a specialized key, a shroud and a retaining ring therebetween.

Another object of the present invention is to provide an embodiment of an improved anti-tamper fastener wherein a rotatable shroud is mounted on a body so that there are axially extending surfaces in engagement substantially throughout the axial length of both the shroud and a body on which the shroud is mounted so that these entire contacting surfaces oppose separation of the shroud from the body.

A further object of the present invention is to provide an improved anti-tamper fastener in which a rotatable shroud is secured to a body by a ring of polygonal cross section which bridges opposed grooves in the body and shroud and thus provides extremely great resistance against their separation. Other objects and attendant advantages of the present invention will be readily perceived hereafter.

The present invention relates to a fastener comprising a body, first and second body ends on said body, a shroud rotatably mounted on said body, first and second shroud ends on said body proximate said first and second body ends, respectively, said first body end extending outwardly beyond said first shroud end, an external surface on said body, an internal surface on said shroud in contiguous relationship to said external surface of said body, first and second opposed grooves in said external surface of said body and said internal surface of said shroud, respectively, a retaining ring bridging said first and second grooves, and a key-receiving opening in said second body end.

The various aspects of the present invention will be more fully understood when the following portions of the specification are read in conjunction with the accompanying drawings wherein:

BRIEF DESCRIPTION OF THE DRAWINGS

FIG. 1 is a fragmentary side elevational view showing a bolt embodiment of the improved fastener of the present invention mounted in a retaining member;

FIG. 2 is an enlarged view partially in cross section of the fastener of FIG. 1 taken substantially along line 2—2 of FIG. 3;

FIG. 3 is a front elevational view taken substantially in the direction of arrows 3—3 of FIG. 2;

FIG. 4 is a cross sectional view taken substantially along line 4—4 of FIG. 2;

FIG. 8 is an exploded side elevational view of a prior art key which is used to turn the bolt embodiment of FIGS. 1-4;

FIG. 9 is an enlarged fragmentary view, partially in cross section, of the end of the prior art key of FIG. 8;

FIG. 10 is an end elevational view taken substantially in the direction of arrows 10—10 of FIG. 9 and showing the configuration of tghe ridge at the end of the key of FIG. 8 which is received in the groove in the face of the fastener of FIGS. 1-4;

FIG. 11 is an exploded view of a prior art key which is used to turn the nut embodiment of the fastener of FIGS. 5-7;

FIG. 12 is an enlarged cross sectional view of the parts of the prior art key of FIG. 11 which engage the fastener of FIGS. 5-7;

FIG. 13 is a view taken substantially in the direction of arrows 13—13 of FIG. 12 showing the ridge which is received in the groove of the fastener of FIGS. 5-7;

FIG. 15 is a view of another bolt embodiment of a fastener partially in cross section taken substantially along line 15—15 of FIG. 16;

FIG. 16 is a front elevational view taken substantially in the direction of arrows 16—16 of FIG. 15;

FIG. 17 is a cross sectional view taken substantially along line 17—17 of FIG. 15;

FIG. 18 is an enlarged fragmentary view taken substantially along line 18—18 of FIG. 17;

FIG. 18A is a further enlarged cross sectional view of a portion of FIG. 18;

FIG. 19 is a fragmentary side elevational view of another type of fastener on which any of the anti-tamper modifications can be used;

FIG. 20 is a fragmentary side elevational view of still another type of fastener on which any of the anti-tamper modifications can be used; and FIG. 21 is an end elevational view taken substantially in the direction of arrows 21—21 of FIG. 20.

DESCRIPTION OF THE PREFERRED EMBODIMENTS

Figure 5:
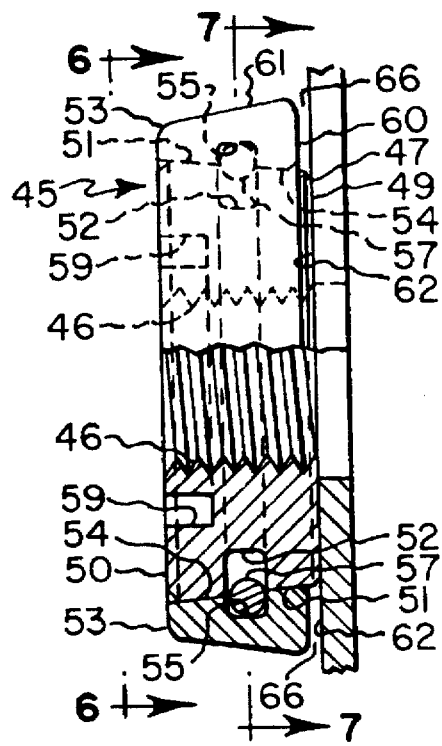
FIG. 5 is a fragmentary side elevational view, partially in cross section, taken substantially along line 5—5 of FIG. 6 and showing a nut embodiment of the present invention.

An improved fastener in the nature of a bolt 10 is shown in FIG. 1 threaded into a nut 11 which is part of a wall 12' to which plate 12 is fastened. It will be appreciated that bolt 10 can be used in any environment in which bolts are normally used to fasten members together or to be received in a nut.

Bolt 10 includes a body 13 having a first body end 14 and a second body end 15. A threaded shank 17 extends outwardly from body end 14. Body 13 has an external surface 19 which is essentially frustoconical between ends 14 and 15 with its larger base being adjacent second body end 15. A chamfer 16 is located at the outer edge of body end 15. An annular groove 20 is located in body 13 and extends inwardly into body 13 from external surface 19. A rotatable shroud 21 has an inner frustoconical surface 22 which is positioned in contiguous relationship to external frustoconical surface 19. The larger base of frustoconical surface 22 is proximate the first body end 14. An annular groove 23 extends inwardly into rotatable shroud 21 from its surface 22 and lies in opposition to annular groove 20. A spring-type of split retaining ring 24 of circular cross section bridges grooves 20 and 23 to retain shroud 21 rotatably mounted on body 13.

A key-receiving curvilinear groove 25 is located in body end 15. A blind bore 26 extends inwardly into body 13 from body end 15. Body end 14 extends outwardly beyond the annular end 27 of shroud 21 so that when body end 14 presses against a member such as plate 12 (FIG. 1), there will be a clearance 29 between plate 12 and annular part 27 so that shroud 21 will remain freely rotatable on body 13. When fastener 10 is in position against plate 12, shroud 21 cannot be pried from body 13 in a direction away from plate 12 because the frustoconical surface 19 has a larger base at body end 15 than at body end 14. Substantially the entire axial lengths of frustoconical surfaces 19 and 22 are in engagement, and this virtually insures that there is no way in which shroud 21 an be pried off of body end 13 in the direction toward body end 15.

The external surface 30 of shroud 21 is preferably frustoconical with its larger base proximate the first body end 14 so that a plier or wrench cannot get a good grip on it. It will be appreciated, however, that the external surface 30 can be of other configurations which will preclude a tool from gripping it, the primary consideration being that the base of the frustoconical shroud at body end 15 be smaller than at the body end 14. In addition, since shroud 21 is rotatable, even if by some remote chance frustoconical surface 30 could be gripped, shroud 21 will merely rotate on body 13 without turning fastener 10.

The prior art key which is used to turn bolt 10 is shown in FIGS. 8–10. Key 31 includes a handle 32 and a shank 33. A ridged member 34 is splined at 35 and is press-fitted into sleeve 37 which in turn is press-fitted onto splined end 39 of shank 33. A cylindrical pin 40 is press-fitted into bore 41 of ridged member 34. Ridged member 34 includes a curvilinear ridge 42 which is of a shape to fit into curvilinear groove 25 in face 15 of fastener 10. To align ridge 42 with groove 25, pin 40 is inserted into blind bore 26 in body end 15 and the shank 33 is rotated until ridge 42 drops into groove 25. Thereafter, continued rotation of shank 33 will cause fastener 10 to rotate also.

Figure 6:
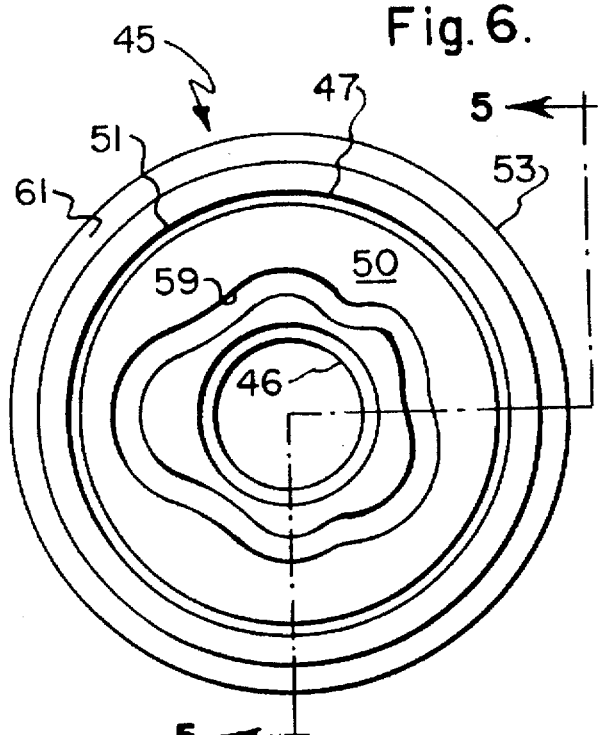
FIG. 6 is a front elevational view taken substantially in the direction of arrows 6—6 of FIG. 5.
Figure 7:
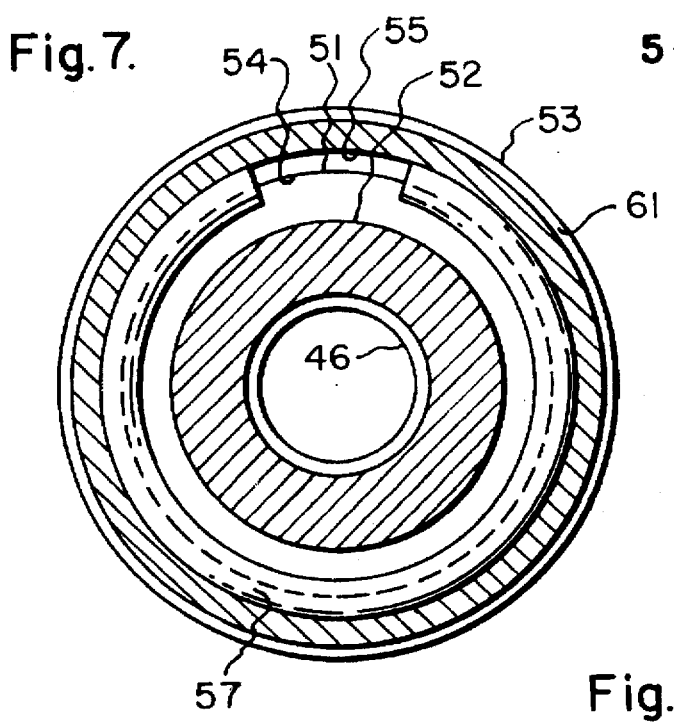
FIG. 7 is a cross sectional view taken substantially along line 7—7 of FIG. 5.

In FIGS. 5–7, a fastener in the form of a nut 45 is shown which differs only from the bolt embodiment 10 of FIGS. 1–4 in that it does not have a shank, but instead has a threaded central opening 46 to receive a bolt. Nut fastener 45 has a body 47 having an end 49 and an end 50. A frustoconical surface 51 extends between ends 49 and 50. An annular groove 52 extends inwardly into body 47 from surface 51. An annular shroud 53 has a frustoconical internal surface 54 which lies in contiguous relationship to frustoconical external surface 51. An annular groove 55 extends inwardly into shroud 53 from surface 54 and lies in opposition to annular groove 52. A spring-like split retaining ring 57 of circular cross section bridges annular grooves 52 and 55 to retain shroud 53 in position on body 47. A curvilinear groove 59 is located in end 50. The end 49 of body 47 extends outwardly beyond the annular end 60 of rotatable shroud 53. The outer surface 61 of rotatable shroud 53 is frustoconical for the purpose of preventing it being gripped by a plier or wrench. In addition, as in the embodiment of FIGS. 1–4, if perchance the outer surface 61 could be gripped to rotate shroud 53, such rotation will not turn body 47 of nut 45. Additionally, it is to be noted that when the end 49 of body 47 is pressed against an external surface 62, there will be a clearance 66 between surface 62 and annular shroud surface 60 so that shroud 61 can rotate freely.

The prior art key 63 of FIGS. 11–13 is used to turn nut 45. Key 63 includes a handle 64 and a shank 65. The key-turning mechanism mounted on the end of shank 65 includes a ridged member 67 having a curvilinear ridge 69 thereon which is of a shape to be received in curvilinear groove 59 of nut 45. Ridged member 67 has a splined end 70 which is press-fitted into bore 71 of sleeve member 72 which is press-fitted onto splined end 73 of shank 65. A sleeve 74 is slidably mounted on sleeve member 72, and it is biased to the right in FIG. 12 by annular spring 75, the outer edge of which is received in annular recess 77 at the end of slidable sleeve 74 and bears against shoulder 80. A ring 81 is mounted on member 72 and is prevented from moving to the left by spring clip 82 which is mounted in groove 83 of member 72. Spring 75 bears against ring 81 and biases sleeve 74 to the right in FIG. 12.

To turn nut 45 with key 63, the annular end 84 of sleeve 74 is pressed against the external frustoconical surface 61 of shroud 53 and the shank 65 is pressed toward nut end 50 until curvilinear ridge 69 engages nut end 50. Thereafter, shank 65 is turned until curvilinear ridge 69 enters curvilinear groove 59. Continued turning of shank 65 will turn nut 45. It will be appreciated that key 63 can also be used to turn bolt 10 of FIGS. 1–4.

Figure 14:
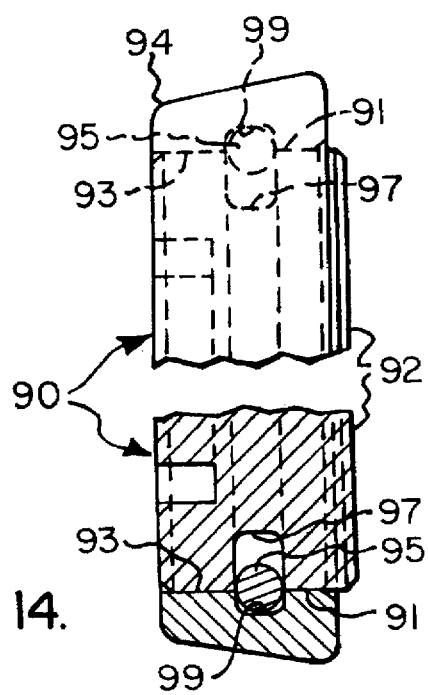
FIG. 14 is a fragmentary cross sectional view similar to FIG. 5 but showing another embodiment of the present invention having a construction which is applicable to both nuts and bolts.

In FIG. 14 another embodiment of the present invention is shown. Nut 90 is identical in all respects to nut 45 of FIGS. 5–7 except that the outer surface 91 of body 92 is cylindrical and the inner surface 93 of shroud 94 is cylindrical, and the spring ring 95, which is analogous to ring 57 of FIG. 7 bridges annular grooves 97 and 99 of body 92 and rotatable shroud 94, respectively. It will be appreciated that cylindrical mating surfaces, such as 91 and 93, can also exist on a bolt type of fastener such as shown in FIGS. 1–4.

In FIGS. 15–18 a still further and preferred embodiment of the present invention is disclosed. Fastener 100, in the nature of a bolt, includes a body 101 having a first end 102 and a second end 103. A threaded shank 104 extends outwardly from body end 102. Body 101 has a frustoconical external surface 105 between ends 102 and 103, with the larger base being proximate body end 102. A chamfer 107 is located at the outer edge of body end 103. An annular groove 109 is located in body 101 and extends inwardly into body 101 from external surface 105. A rotatable shroud 110 has an inner frustoconical surface 111 which is positioned in contiguous relationship to external frustoconical surface 105. An annular groove 112 extends inwardly into rotatable shroud 110 from its surface 111 and lies in opposition to annular groove 109. A spring-type of split retaining ring 113 of square cross section bridges grooves 109 and 112 to retain shroud 110 rotatably mounted on body 101.

A key-receiving curvilinear groove 114 is located in body end 103. A blind bore 115 extends inwardly into body 101 from body end 103. Body end 102 extends outwardly beyond the annular end 117 of shroud 110 so that when body end 102 presses against a member, there will be a clearance such as 29 of FIG. 1 between annular shroud part 117 and the surface against which body end 102 presses. The external surface 119 of shroud 110 is frustoconical so that a plier or wrench cannot get a good grip on it.

The embodiment of FIGS. 15–18 differs from the embodiment of FIGS. 1–4 in two respects. The taper of frustoconical surface 105 of body 101 is in an opposite direction to the frustoconical surface 19 of FIG. 2. This permits the thickness of shroud 110 to be substantially constant throughout its axial length between its end surfaces 117 and 120. This configuration causes shroud 110 not to be subject to an outer edge portion which is relatively thin, which occurs in the embodiment of FIGS. 1–4. If for any reason the shroud 110 should be pried off, the fastener 100 will still retain its anti-tamper characteristic because the exposed frustoconical surface 105 of body 101 cannot be gripped by a wrench or plier. In addition, the split spring type of ring 113 of FIGS. 15–18 is of square cross section, and thus it provides edges 121 and 122 which substantially lie parallel to the edges 123 and 124 of groove 112 and edges 125 and 126 of groove 109. As can readily be visualized from FIGS. 1–4, the split ring of 24 of circular cross section does not have this relationship, and thus the square ring provides much greater resistance against separation of shroud 110 from body 101. While ring 113 has been shown as being of square cross section, it will be appreciated that it can be of any suitable polygonal cross section and more specifically of quadrilateral cross section and preferably of square or rectangular cross section.

In FIG. 19 another modified form of fastener 127 is shown which can have any one of the preceding anti-tamper portions of FIGS. 1–4, 14 or 15 at its end 129. The fastener 127, which is in the nature of a bolt, differs from the bolt of FIGS. 1 and 15 in that it has a cylindrical shoulder 130.

In FIGS. 20 and 21 a further modified form of fastener 131 is shown which can have any one of the preceding anti-tamper portions of FIGS. 1–4, 14 or 15 at its end 132. Fastener 131 is essentially in the nature of a pin having a shank 133 having a cylindrical portion 134 with an annular groove 135 therein for receiving a clip and a square portion 137 which is adapted to be received in a square opening of another part which is to be turned when shank 133 is turned.

It will be appreciated that any one of the fasteners of the present invention which are either in the nature of a bolt or a nut can have any of the anti-tamper configurations disclosed. In this respect, a bolt can have the anti-tamper and shroud modifications of FIGS. 1–4 or of FIG. 14 or of FIGS. 15–18. Additionally, for example, the nut embodiment of FIGS. 5–7 can have any of the anti-tamper shroud configurations of FIGS. 1–4, or FIG. 14, or FIGS. 15–18.

While all embodiments have shown the outer surface of the rotatable shroud as preferably being frustoconical, it will be appreciated that it can be of any other suitable configuration, including cylindrical, inasmuch as gripping and turning it will not result in the turning of the body of the fastener because of the fact that the shroud is freely rotatable on the body of the fastener.

While preferred embodiments of the present invention have been disclosed, it will be appreciated that the present invention is not limited thereto but can be otherwise embodied within the scope of the following claims.

What is claimed is:

1. A fastener comprising a body, first and second body ends on said body, a shroud rotatably mounted on said body, first and second shroud ends on said body proximate said first and second body ends, respectively, said first body end extending outwardly beyond said first shroud end, an external surface on said body, an internal surface on said shroud in contiguous relationship to said external surface of said body, first and second opposed grooves in said external surface of said body and said internal surface of said shroud, respectively, a retaining ring bridging said first and second grooves, and a key-receiving opening in said second body end.

2. A fastener as set forth in claim 1 wherein said external surface of said body is frustoconical with its larger base proximate said first body end.

3. A fastener as set forth in claim 2 wherein said retaining ring is of polygonal cross section.

4. A fastener as set forth in claim 3 wherein said retaining ring is of quadrilateral cross section.

5. A fastener as set forth in claim 2 wherein said fastener includes a threaded shank extending outwardly from said first body end.

6. A fastener as set forth in claim 5 wherein said retaining ring is of polygonal cross section.

7. A fastener as set forth in claim 6 wherein said retaining ring is of quadrilateral cross section.

8. A fastener as set forth in claim 2 wherein said fastener includes a threaded bore in said body.

9. A fastener as set forth in claim 8 wherein said retaining ring is of polygonal cross section.

10. A fastener as set forth in claim 9 wherein said retaining ring is of quadrilateral cross section.

11. A fastener as set forth in claim 2 wherein said key-receiving opening is a curvilinear groove.

12. A fastener as set forth in claim 11 wherein said retaining ring is of polygonal cross section.

13. A fastener as set forth in claim 12 wherein said retaining ring is of quadrilateral cross section.

14. A fastener as set forth in claim 13 wherein said fastener includes a threaded shank extending outwardly from said first body end.

15. A fastener as set forth in claim 13 wherein said fastener includes a threaded bore in said body.

16. A fastener as set forth in claim 1 wherein said external surface of said body is frustoconical with its larger base proximate said second body end.

17. A fastener as set forth in claim 16 wherein said retaining ring is of polygonal cross section.

18. A fastener as set forth in claim 17 wherein said retaining ring is of quadrilateral cross section.

19. A fastener as set forth in claim 16 wherein said fastener includes a threaded shank extending outwardly from said first body end.

20. A fastener as set forth in claim 19 wherein said retaining ring is of polygonal cross section.

21. A fastener as set forth in claim 16 wherein said fastener includes a threaded bore in said body.

22. A fastener as set forth in claim 21 wherein said retaining ring is of polygonal cross section.

23. A fastener as set forth in claim 16 wherein said key-receiving opening is a curvilinear groove.

24. A fastener as set forth in claim 23 wherein said retaining ring is of polygonal cross section.

25. A fastener as set forth in claim 24 wherein said fastener includes a threaded shank extending outwardly from said first body end.

26. A fastener as set forth in claim 24 wherein said fastener includes a threaded bore in said body.

27. A fastener as set forth in claim 1 wherein said shroud includes an external surface which is frustoconical with its larger base proximate said first body end.

28. A fastener as set forth in claim 27 wherein said external surface of said body is frustoconical with its larger base proximate said first body end.

29. A fastener as set forth in claim 28 wherein said retaining ring is of polygonal cross section.

30. A fastener as set forth in claim 29 wherein said key-receiving opening is a curvilinear groove.

31. A fastener as set forth in claim 27 wherein said external surface of said body is frustoconical with its larger base proximate said second body end.

32. A fastener as set forth in claim 31 wherein said key-receiving opening is a curvilinear groove.

33. A fastener as set forth in claim 32 wherein said retaining ring is of polygonal cross section.

34. A fastener as set forth in claim 27 wherein said retaining ring is of polygonal cross section.

35. A fastener as set forth in claim 34 wherein said key-receiving opening is a curvilinear groove.

* * * * *